UNITED STATES PATENT OFFICE.

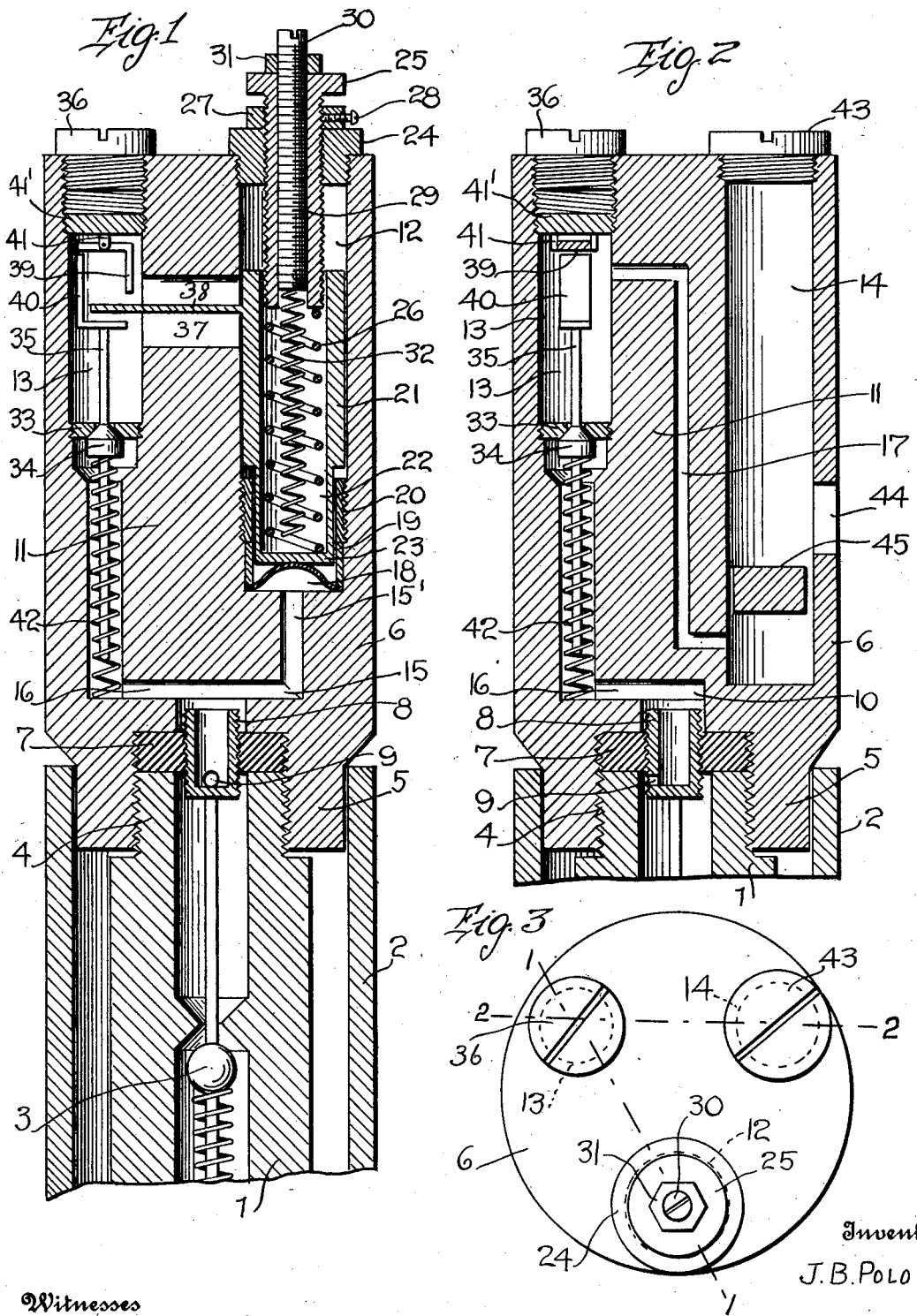

JOSEPH B. POLO, OF CLEAR LAKE, SOUTH DAKOTA.

ALARM FOR PNEUMATIC TIRES.

1,078,061.   Specification of Letters Patent.   Patented Nov. 11, 1913.

Application filed April 26, 1913. Serial No. 763,861.

*To all whom it may concern:*

Be it known that I, JOSEPH B. POLO, a citizen of the United States, residing at Clear Lake, in the county of Deuel and State of South Dakota, have invented certain new and useful Improvements in Alarms for Pneumatic Tires, of which the following is a specification, reference being had to the accompanying drawings.

This invention comprehends certain new and useful improvements in alarms for pneumatic tires and has for its object to provide an alarm which will give an audible signal when the pressure within the tires decreases below a predetermined point.

Another object is to provide a device of this character which will be automatic in operation and which will be of comparatively simple construction and highly efficient in operation.

Another object is to provide a device of this character which may be of compact form, being composed of a single cylinder having a pair of parallel longitudinal bores with operative parts positioned therein and connections between said bores, thereby making the device extremely cheap to manufacture and highly efficient and effective in giving an audible signal upon either increase or decrease of pressure within the tire beyond a predetermined point.

Another object is to generally improve and simplify the construction of devices of this character and increase the efficiency and durability of the same.

With the above and other objects in view, my invention consists in certain novel constructions, arrangements, and combinations of parts to be hereinafter more fully described, claimed and illustrated in the accompanying drawings, in which—

Figure 1 is an enlarged longitudinal sectional view of my complete device applied to the end of a valve stem, said view being taken on the line 1—1 of Fig. 3; Fig. 2 is a vertical sectional view at an angle to Fig. 1, said view being taken substantially on the line 2—2 of Fig. 3; and Fig. 3 is a top plan view of the complete device.

Referring more specifically to the drawings in which similar reference characters designate corresponding parts throughout the several views, 1 designates the valve stem of the ordinary form employed in connection with pneumatic tires and surrounded by a protecting sleeve 2, which may be secured to the wheel felly (not shown), in any suitable manner.

The ordinary check valve 3 is positioned in the end of the valve stem, and the extremity of the valve stem is reduced and threaded, as shown at 4, for engagement in the reduced lower internally threaded end 5 of the member 6, the protecting sleeve 2 surrounding and connecting the ends of the valve stem 1 and member 6.

Within the reduced lower internally threaded end of the member 6 is positioned the washer 7, preferably formed of lead but which may be constructed of any pliable metal or alloy, or any other suitable material. The end of the valve stem is engaged against the washer 7 and the check valve 3 is retained in open position by means of the stop member 8 against the lower closed end of which the stem of the check valve 3 is engaged, the stop member 8 having its upper end open and threaded in a central threaded opening of the washer 7. The stop member 8 is of such size that the wall thereof is spaced from the interior of the valve stem 1 and the stop member 8 is provided in said wall with the opening 9 to allow the air from the stem 1 to enter the member 6 at the point 10.

The central portion of the member 6 is solid, as shown at 11, and said member 6 is provided with three equally spaced longitudinal bores around the solid central portion 11, said bores being designated by the numerals 12, 13 and 14, respectively.

Leading from the point 10 in the member 6 to the bottom of the longitudinal bore 12 is an air passage 15 and a second air passage 16 extends at substantially right angles to the passage 15 and leads from the point 10 to the bottom of the cylinder 13. A substantially Z-shaped air passage 17 extends through the solid central portion 11 of the member 6 and has one end communicating with the upper end of the longitudinal bore 13 while the opposite end of the air passage 17 connects with the lower end of the longitudinal bore 14 while the opposite end of the air passage 17 connects with the lower end of the longitudinal bore 14. The purposes of these air passages will presently appear.

It will be understood that the end of the air passage 15 connecting with the longitudinal bore 12 is directed upwardly, as shown at 15', before connecting with the bottom of said longitudinal bore 12. A diaphragm 18 is positioned upon the bottom wall of the longitudinal bore 12 and is held in place by the ring 19 within the longitudinal bore and bearing upon the upper face of the diaphragm around the edge of the latter, said ring 19 being held in position by means of a second ring 20, which is provided with exterior threads engaged with the threaded wall of the bore 12, as will be readily understood by referring to the drawings. Positioned within the longitudinal bore 12 and adapted for longitudinal or vertical movement therein is the thimble 21 which has its lower portion reduced as shown at 22, and has its closed lower end 23 engaged against the central portion of the upper face of the diaphragm 18. The lower portion of the thimble 21 is reduced to avoid the rings 20 and 19, as said lower portion of the thimble projects into the rings.

Threaded in the upper end of the bore 12 is the closure cap 24 through which is threaded a screw 25 against the inner end of which is engaged one end of a coil spring 26 which has its opposite end engaged against the upper face of the bottom 23 of the thimble 21, it being understood that the coil spring 26 is within the thimble 21 and that the lower end of the screw 25 extends into the open upper end of the thimble. The tension of the spring 26 may be readily adjusted by turning the screw 25 in the proper direction in the closure cap 24. When the screw 25 has been properly adjusted, it is locked against further inward movement by means of the stop collar 27 threaded upon said screw 25 and adapted for engagement against the outer face of the closure cap 24, said collar 27 being provided with a set screw 28 for preventing movement of said collar after the latter has been adjusted upon the screw 25. The screw 25 is provided with a threaded longitudinal central bore 29 within which is threaded a second screw 30 which also has a stop collar 31 threaded and adapted for engagement against the head of the first or larger screw 25 to limit inward movement of the screw 30. The second or smaller screw 30 has secured to its inner end one end of a smaller coil spring 32, the opposite end of which is normally spaced a short distance above the bottom 23 of the thimble 21. The purpose of the springs 26 and 32 will presently appear.

Within the longitudinal bore 13 is formed a valve seat 33 against which is normally seated the valve 34 mounted upon the valve rod 35. The upper end of the longitudinal bore 13 is closed by the screw plug 36. The longitudinal bores 12 and 13 are connected at spaced distances from their upper ends by means of the transverse passage 37 through the solid central portion of the member 6 and extending through this passage 37 and into the longitudinal bore 13 is the stud 38 carried by the thimble 21, the free end of the stud 38 being above the upper end of the valve rod 35. It will be understood that the stud 38 extends laterally over the thimble 21 and that the free end of the stud extends between the depending end of the L-shaped rock member 39 and the horizontal arm of the L-shaped slide member 40. The horizontal arm of the L-shaped rock member 39 is pivoted in the free end of a bracket arm 41 secured to the wall of the bore 13 near the upper end of the latter, said rock member 39 being above the free end of the stud 38. The upper extremity of the vertical arm of the slide member 40 is directly below the free horizontal arm of the rock member 39 and adapted at times to be engaged by the latter to force the slide member 40 downwardly and thereby unseat the valve 34, it being understood that the lower or horizontal arm of the slide member 40 rests upon the upper end of the valve rod 35.

It will be understood that the valve rod 35 is retained in its uppermost position with the valve 34 against the valve seat 33 by means of the coil spring 42 secured around the lower portion of the valve stem, one end of the spring being secured to the valve stem while the opposite end rests upon the bottom of the bore 13.

The lower portion of the longitudinal bore 13 is preferably reduced in diameter and the upper portion threaded in order that the valve seat 33 may be readily threaded into position from the upper end of the longitudinal bore 13 after the valve 34 and valve stem 35 have been placed in the bore. It will be understood that the bracket arm 41 is carried by a ring 41' threaded in the upper end of the bore 13, after the valve 34, valve stem 35, valve seat 33, spring 43 carried by the valve stem 35 and slide member 40 have been placed in position in the bore and that the closure cap 36 is then placed in the upper end of the bore to close the same.

The bore 14 has its upper end closed by a closure cap 43 threaded in its upper end and this bore also has an air escape opening 44 in its outer wall and a milled plate 45 in its lower end below the air escape opening 44 and above the lower end of the Z-shaped air passage 17.

It will be understood that when the device is in use, the valve 3 is retained in open position, thereby causing the air pressure from the tire to work upon the diaphragm 18 and thereby retain the thimble 21 in normal position with the stud 38 spaced from both the rock member 39 and the slide member 40, it being understood that the screws 25 and 30 have been properly adjusted to regulate the position and tension of the springs 26 and 32, respectively.

It will also be seen that should the air pressure decrease below a predetermined point, the thimble 21 will be caused to move downwardly under action of the spring 26, causing the stud 38 to force the slide member 40 downwardly and thereby open the valve 34 to allow air to travel upwardly past the valve 34, through the air passage 17 and past the plate 45 into the atmosphere by means of the air escape opening 44, thereby giving an audible signal.

It will likewise be seen that should the air pressure within the tire be above a predetermined point, the diaphragm 18 will expand sufficiently to force the thimble 21 upwardly against the tension of both of the springs 26 and 32 until the stud 38 engages the rock member 39 causing the same to rock upon its pivot and force the slide member downwardly, and thereby open the valve 34 sufficiently to allow the proper amount of air to pass said valve and travel downwardly through the air passage 17, into the bore 31, past the plate 45 and out to the atmosphere by means of the air escape opening 44, the springs 26 and 32 causing the thimble 21 to descend and thereby permit the spring 42 to close the valve 34 when the proper amount of air has escaped to the atmosphere thereby preventing the pressure from decreasing below the predetermined point.

While I have shown the preferred embodiment of my invention, it will be understood that minor changes in the details of construction and arrangements of parts may be made within the scope of the appended claims without departing from the spirit of my invention.

What I claim is:—

1. A device of the class described comprising a cylindrical member having a plurality of parallel longitudinal bores and adapted for engagement upon the valve stem of the pneumatic tire, means carried by the cylindrical member for retaining the valve in the valve stem in open position and allowing air from the stem to enter the lower end of the cylindrical member, one of the bores having communication at its lower end with the lower end of the cylindrical member, the second bore also having communication with the lower end of the cylindrical member, said cylindrical member having an air passage connecting the second bore with the third bore, a slidable thimble within the first bore, a normally closed valve within the second bore, means for retaining the thimble in normal position, the third bore having an air escape opening and a plate adjacent said opening, the thimble being adapted to be moved in one direction upon an increase of air pressure in the stem, means for moving the thimble in the opposite direction upon a decrease of the air pressure within the stem, and means carried by the thimble for opening the valve in the second bore to allow air to pass the valve, travel through the air passage to the third bore, and past the plate and escape to the atmosphere through the air escape opening in the third bore and thereby give an audible signal upon movement of the thimble in either direction.

2. A device of the class described comprising a solid cylindrical member having an open end adapted for engagement upon a valve stem, means carried by the solid cylindrical member for retaining the valve of the valve stem in open position to allow the air from the same to enter the open end of the cylindrical member, a bore within said cylindrical member and having communication with the open end of the same, a second bore within the cylindrical member and having communication with the open end of the same, a third bore within the cylindrical member and having an air escape opening, a plate adjacent said opening, an air passage from the second bore to the third bore, a valve within the second bore, means for resiliently retaining the valve in closed position, a slidable thimble within the first bore, a diaphragm within the first bore and engaged against the thimble, said diaphragm being normally expanded by the air from the valve stem, adjustable means engaged with the thimble and adapted to force the same downwardly upon decrease of the pressure within the valve stem, the diaphragm being adapted to force the thimble upon increase of the pressure within the valve stem, and means carried by the thimble and extending into the second bore for opening the valve in said second bore and allowing air to pass the same to reach the air passage connecting the second and third bores upon movement of the thimble beyond a predetermined distance in either direction.

3. An alarm for pneumatic tires comprising a cylindrical member having an air chamber in one end, means for securing the cylindrical member to the valve stem and pneumatic tire, means carried by the cylindrical member for retaining the valve of the stem in open position, and allowing air to travel from said stem to the air chamber of the cylindrical member, said cylindrical member having a central portion and a plurality of longitudinal bores around the central portion, connections between the inner end of one of the bores and the air chamber, connections between the corresponding end of another of said bores, and the air chamber, connections between the lower end of the third bore and the upper end of the second bore, means for closing the outer ends of said bores, a diaphragm in the lower end of the first bore, a slidable thimble within the first bore, means for resiliently retaining the thimble in engagement with the diaphragm, a valve within the second bore, the central portion of the cylindrical member being provided with a transverse opening a spaced distance from the outer end of said member, the third bore being provided with an air escape opening in its outer wall, a plate within the third bore and positioned adjacent the air escape opening, and means carried by the thimble and extending through the transverse opening in the central portion of the cylindrical member and into the second bore to open the valve in the second bore and allow air to travel past the valve, to the third bore and past the plate and escape to the atmosphere by means of the air escape opening and thereby give an alarm upon a change of the air pressure beyond a predetermined point.

In testimony whereof I hereunto affix my signature in the presence of two witnesses.

JOSEPH B. POLO.

Witnesses:
E. E. WALSED,
J. A. THRONSON.